W. V. JOHNSON & J. L. McDOWELL.
MINE CAR.
APPLICATION FILED AUG. 5, 1915.

1,183,982.

Patented May 23, 1916.

Inventors
Warren V. Johnson
and John Lee McDowell
By T. H. Gibbs
Attorney

UNITED STATES PATENT OFFICE.

WARREN V. JOHNSON AND JOHN LEE McDOWELL, OF BLOOMSBURG, PENNSYLVANIA, ASSIGNORS TO AMERICAN CAR AND FOUNDRY COMPANY, OF NEW YORK, N. Y., A CORPORATION OF NEW JERSEY.

MINE-CAR.

1,183,982.  Specification of Letters Patent.  Patented May 23, 1916.

Application filed August 5, 1915. Serial No. 43,794

*To all whom it may concern:*

Be it known that we, WARREN V. JOHNSON and JOHN LEE McDOWELL, residing at Bloomsburg, Columbia county, Pennsylvania, and being citizens of the United States, have invented certain new and useful Improvements in Mine-Cars, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

Figure 1:
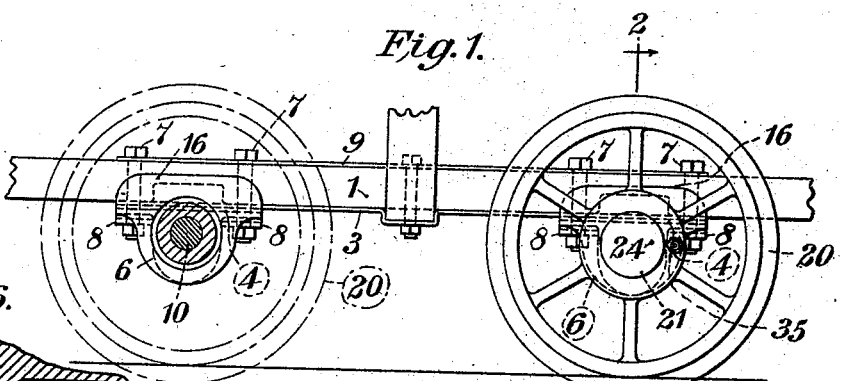
Figure 6:
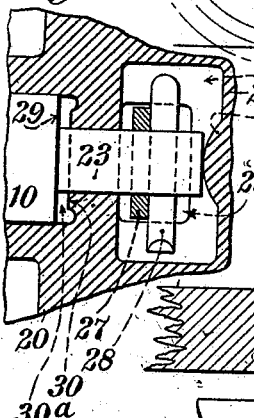
Figure 2:
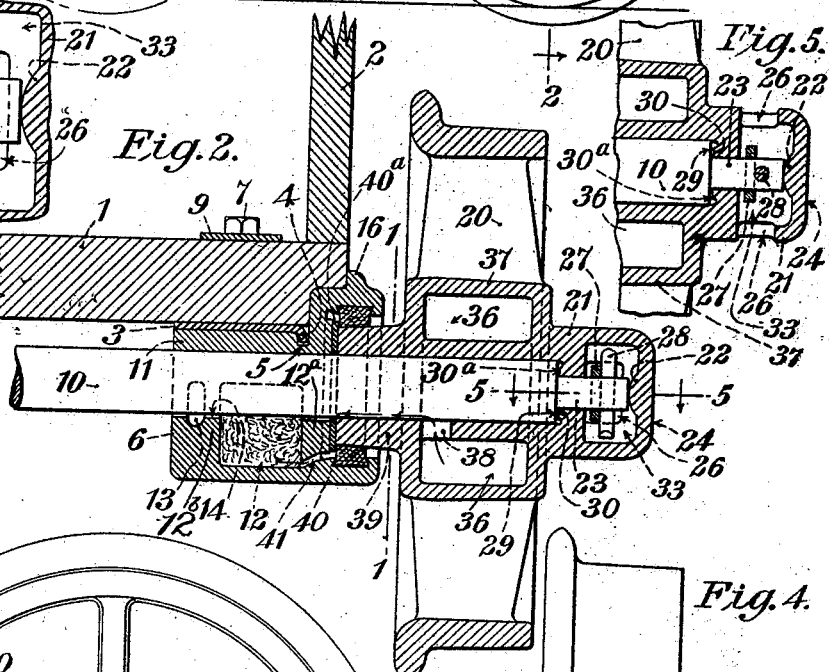
Figure 5:
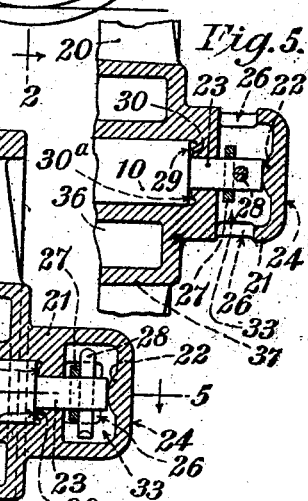
Figure 3:
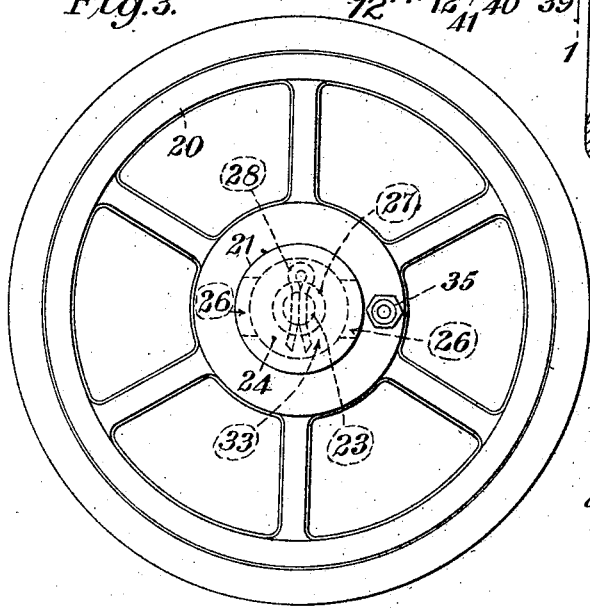
Figure 4:
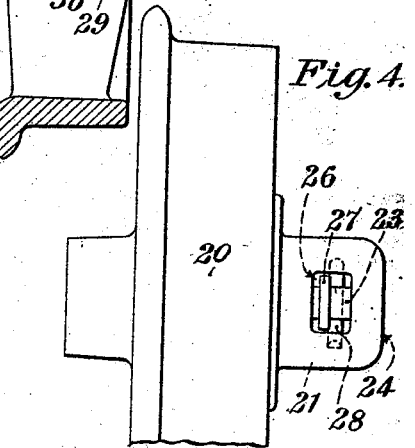

In said drawings: Figure 1 is an elevational view showing the running gear assembly of a mine car truck, one wheel at the right being shown in full lines, and the wheel at the left being shown in dot and dash lines, and the sectional portion at the left indicating a section on line 1—1 of Fig. 2. Fig. 2 is a central vertical sectional view, the section being taken approximately on line 2—2 of Fig. 1. Fig. 3 is an enlarged detail elevational view of one of the wheels used with the improved truck. Fig. 4 is a fragmentary edge view of such wheel. Fig. 5 is a central horizontal sectional view, the section being taken on line 5—5 of Fig. 2. Fig. 6 is an enlarged fragmentary detail hereinafter described.

One of the objects of the invention is to provide a simple, light and economical assembly for mine cars comprising a truck equipped with a pair of axles and preferably four wheels which extend into journal boxes rigidly connected together and to the body portion of the mine car in which assembly the wheels are secured on the axles by means passing through the axles in what are generally termed closed hub wheels in which the ends of the axles have bearings against the inner faces of the hub portions of the wheels, there being lubricating chambers provided in such wheels adapted to carry lubricant and there being also provided spring control valves adapted to close the ingress passages to the interior of such lubricating chambers.

Among the advantages attained are a plurality of bearings for the axle within the wheels, ready accessibility to the means employed for locking the wheels to the axle and economy of lubricant employed to lubricate the journal box and wheel assembly.

Other features of advantage will be hereinafter pointed out.

Referring specifically to the parts, 1 indicates the bottom portion of a mine car, 2 a side wall, said bottom portion and side wall being broken off, 3 indicates a longitudinally extending connection and locking strap adapted to be secured to the floor or lower sill 1 of the mine car body and said strap is provided with a downturned flange 4 which is adapted to interlock with recesses 5 formed in the upper faces of the journal boxes 6 so that when the bolts 7 are projected through the outstanding portions 8 of said journal boxes, through the floor 1, and the floor strap 9 and the pairs of wheels are connected through their journal boxes, etc. there is also provided additional locking means to hold the journal boxes in position and thereby relieve stresses on the bolts 7, said interlocking means being provided by the flange and recessses 4, 5, hereinbefore referred to, whereby movement of the journal boxes longitudinally of the axles 10 is prevented.

The journal boxes 6 are provided with bearing portions 11 in which are formed lubricant pockets 12 and 13, which as will be noted from an inspection of Fig. 2 are connected by the passage 14 when the axle 10 is in position. The front and rear walls 12$^a$, 12$^b$ respectively of lubricant pocket 12 rise nearly to the plane of the axle 10 whereby the front wall 12$^a$ is adapted to serve as an abutment to receive the end thrust of the wheels of said axle, suitable washers being interposed as is usual with this class of assembly, if desired. The journal boxes are also provided with enlarged outer end portions 16 adapted to rest against the outer faces of the ends of the floor boards 1 or 10 the side sill of the truck, if such sill shall be employed, the object of the portions 16 being to provide bearings to assist in holding the journal boxes in position. Coöperating with the journal boxes are wheels 20 which in general appearance follow the conventional lines of mine car wheels, but to provide for end thrust of the wheels on the axles and to minimize the loss of lubricant due to such end thrust, the hub portions 21 of the wheels are substantially closed, as shown in Figs. 1, 3 and 4, and provide on their inner faces embossments 22 adapted to receive the end thrust of the reduced portion 23 of the axle 10, the outer face 24 of the wheel hub being preferably imperforate as shown, while the perimeter of the hub extension 21 is cored out to form the passages 26 through which passages are inserted the washer 27 and the pin 28, which latter may be a cotter pin as shown in Fig. 3 or may be any conveniently shaped pin adapted to serve as a linch pin.

In longitudinal alinement with the shoulders 29 on the axles 10 the interior hub portion of the wheel is partly closed as indicated at 30, thereby providing an end bearing for the shoulders 29 and also providing a circumferential bearing for the reduced outer end portions 23 of the axles 10. The washer and the pin are free to rotate within the pocket 33 when the wheel 20 revolves upon the axle 10 and it is to be noted that one of the passages 26 leading to said pocket may be of only sufficient area to permit inserting of said washer and the other passage leading from the opposite side may be only large enough to permit insertion of the cotter or other pin 28, one of the objects being to close the end portion of the hub as much as possible.

35 indicates a spring held valve which closes the passage from the exterior of the wheel to the lubricating chamber 36 within the interior hub portion 37 in which lubricating chamber is stored a sufficient quantity of lubricant for use over a considerable period of time, the lubricant finding its way through the passage 38 to the axle bearing where it is entrained and passes rearwardly through the hub portion 39 past the packing 40—40ª, thence through the conduit 41 into the oil reservoir 12—13 of the journal box, referred to.

The means for securing the wheels to the axle, at the same time providing end thrust bearings against the interior faces of closed hub wheels, results in a considerable saving of lubricant and by means of the communication passages for such lubricant, hereinbefore referred to, the lubricant is caught in the lubricant pockets in the journal boxes after passing through the wheels.

Inspection of Figs. 2 and 5 will show that the end of the axle may contact with the embossment 22 while its shoulder 29 is out of contact with the shoulder 30 of the wheel hub, thereby providing a passage 30ª for the reception of lubricant which is there pocketed and is not forced out of the smaller bore portion of the hub as it would be if the shoulder of the axle were free to contact with the shoulder 30 of the hub. In the latter condition a pumping action will result which causes loss of a considerable quantity of lubricant that is saved by the details of construction illustrated in Fig. 6.

The pocket 12 is large enough to hold a considerable quantity of waste and lubricant which latter is added to from time to time from the wheel in service and to prevent loss the packing ring is inserted, preferably bearing on a trued outer surface of the wheel hub portion 39 and thereby providing a continuous and practically leak proof lubricant passage from the valve 35 to pocket 13, through the wheel and journal box.

What we claim as new is:

1. In combination in a mine car, coupled pairs of wheels and journal boxes, the journal boxes having recesses in their upper faces, coupling means resting in said recesses, said wheels extending into said journal boxes, means connecting said journal boxes, axles passing through the journal boxes and into but not through said wheels, intercommunicating lubricant receptacles in the wheels and journal boxes and wheel securing means passing entirely through the axles.

2. In combination in a mine car, coupled pairs of journal boxes having recesses in their upper portion, connecting members having flanges resting in said recesses, axles having middle portions of relatively large diameter and of less diameter at their end portions, wheels having hubs projecting into said journal boxes at one side and having the opposite sides of said hubs closed in alinement with said axles and keys in said closed hub portions extending through said axles.

3. In combination in a truck, spaced pairs of journal boxes, straps having flanges thereon interlocking with recesses in said journal boxes, axles extending through said journal boxes and rotatable therein, said axles having end portions of reduced diameter, wheels each having an axle bearing of two diameters fitting the end portions of said axles abutting the ends of the axles and projecting into said journal boxes and pins extending through said axles within the hub portions of said wheels.

4. In combination, a journal box having an axle bore, and an enlarged opening at one end; a wheel having a closed outer hub portion and provided with axle bearings of two diameters within said hub portion, a portion of the hub having the bearing of larger diameter projecting into said journal box and a portion of the wheel hub having an axle bearing of less diameter inclosing and adapted to abut the end of an axle, and a pin passing entirely through said axle.

5. In combination, a journal box open at its outer end, a wheel having an extension at one side of its hub loosely revoluble in said journal box, said hub being closed at the end thereof opposite said journal box and there being an axle opening of large and of small diameter within said wheel, an axle of two diameters passing through said journal box into said wheel and abutting the inner face of a closed outer hub portion thereof, and a pin passing entirely through said axle.

6. In combination, a wheel having therein an axle bearing of two diameters and a closed outer hub portion adapted to bear against the end of an axle, an axle having an end portion of reduced diameter extending part way into the portion of the wheel hub having an axle bearing of larger diameter, said axle having a larger diameter extending from thence through the opposite side of the wheel hub, and a pin extending through the end portion of said axle to lock said wheel thereon.

7. In combination, a journal box and a wheel having intercommunicating lubricant reservoirs, the wheel having an axle bearing of large and small diameters, an axle of a large diameter in one part of said wheel and of lesser diameter in another part of said wheel, the wheels extending across the outer end of the axle, there being an annular lubricant passage formed by the axle and axle bore within the wheel, and means extending through said axle to secure the wheel in position thereon.

8. In combination, a journal box having a bearing portion and a flanged open end portion in combination with a closed-hub wheel having a flange entering said open end of the journal box and being provided with an axle-bearing of two diameters, an axle of two diameters in said axle-bearing the larger diameter of the axle being so disposed with relation to said wheel as to provide an annular lubricant reservoir surrounding the inner portion of smaller diameter of the axle at the end of the larger diameter thereof.

9. In combination, a journal bearing box having a lubricant reservoir with a wall portion at the front and rear sides thereof and a flanged open end portion, said front wall portion being adapted to serve as an abutment for a wheel hub, in combination with a closed hub wheel cast as an integer with a flange entering said open end of the journal box in alinement with said wall portion, said wheel having an axle bearing of two diameters, an axle of two diameters in said axle bearings, and means extending through said axle adapted to secure the wheel on the axle.

In witness whereof we have hereunto set our hands in the presence of two witnesses.

WARREN V. JOHNSON.
JOHN LEE McDOWELL.

Witnesses:
  FRED F. BROBST,
  FRANK B. WHITE.